(12) United States Patent
Zimmerman

(10) Patent No.: US 6,951,332 B2
(45) Date of Patent: Oct. 4, 2005

(54) FIFTH WHEEL RELEASE LEVER

(76) Inventor: Dennis R. Zimmerman, 3146 Neeley Loop, American Falls, ID (US) 83211-5531

( * ) Notice: Subject to any disclaimer, the term of this patent is extended or adjusted under 35 U.S.C. 154(b) by 124 days.

(21) Appl. No.: 10/629,752

(22) Filed: Jul. 30, 2003

(65) Prior Publication Data

US 2005/0023848 A1    Feb. 3, 2005

(51) Int. Cl.$^7$ .............................................. B66F 3/00
(52) U.S. Cl. .................................................... 254/131
(58) Field of Search ........................ 269/131, 30, 17, 269/113, 120; 299/17

(56) References Cited

U.S. PATENT DOCUMENTS

| | | |
|---|---|---|
| 4,251,089 A | 2/1981 | Skaggs |
| 4,778,181 A | 10/1988 | Arney |
| 4,871,182 A | 10/1989 | Altherr et al. |
| 4,991,893 A | 2/1991 | Gordon et al. |
| 5,378,007 A | 1/1995 | Joyce |
| 5,423,567 A | 6/1995 | Upton |
| 5,462,385 A * | 10/1995 | Mohlengraft ................ 404/25 |
| D377,924 S | 2/1997 | Christensen |
| 5,775,674 A * | 7/1998 | Bigham ...................... 254/131 |
| 5,803,518 A | 9/1998 | Gibbons |
| 5,863,060 A | 1/1999 | Hollis et al. |
| 5,988,666 A | 11/1999 | Flater |
| 6,092,825 A | 7/2000 | Flater |
| 6,354,642 B1 | 3/2002 | Haggerty |
| 6,375,162 B1 * | 4/2002 | Johnson ...................... 254/131 |

FOREIGN PATENT DOCUMENTS

| | | |
|---|---|---|
| GB | 1407084 | 9/1975 |
| GB | 2160163 | 12/1985 |

* cited by examiner

Primary Examiner—Robert C. Watson
(74) Attorney, Agent, or Firm—Richard C. Litman (57) ABSTRACT

A second class lever device provides additional mechanical advantage to pull the release handle in the fifth wheel hitch of a truck tractor and semi trailer combination. Such release handles can bind and become difficult to release due to misalignment between tractor and trailer, corrosion or lack of lubrication, etc. The present release lever includes an elongate fulcrum bar to bridge the gap between the tractor tires and the overlying side of the trailer, with a lever arm extending therefrom. A tension member extends from the lever arm, between the handle end and fulcrum end thereof. The lever arm telescopes for storage, with the fulcrum bar pivoting and sliding in its lever arm attachment to further facilitate compact storage. The tension member preferably comprises a chain, with a release handle engaging hook adjustably installed on the chain to adjust the effective length thereof as required.

16 Claims, 4 Drawing Sheets

FIFTH WHEEL RELEASE LEVER

BACKGROUND OF THE INVENTION

1. Field of the Invention

The present invention relates generally to specialized tools for use in the trucking industry, and more specifically to a collapsible tool for releasing the jaws retaining the kingpin in a fifth wheel assembly of a truck tractor. The present tool comprises a folding lever which may be braced across the rear tires of the tractor and overlying front portion of the trailer, to assist the user in releasing a stubborn or difficult to release fifth wheel release jaw.

2. Description of the Related Art

Heavy trucks used in the over the road trucking industry, have been standardized to a great extent over the years. Basically, such trucks comprise a tractor with driver's cab, engine, controls, etc., and a drive wheel system of from one to two axles and four to eight wheels. A so-called "fifth wheel" is positioned generally above the drive wheels for removable attachment of the king pin hitch of a semitrailer thereto, with a release handle being provided at the fifth wheel. The front end of such a semitrailer is supported by the drive wheels of the truck tractor, when the trailer is connected thereto.

It will be appreciated that the front end of a semitrailer may weigh on the order of twenty tons, depending upon the total load being carried and the weight distribution in or on the trailer. Accordingly, the force required to pull the fifth wheel release handle in order to release the hitch jaws from the trailer hitch king pin can be extremely high, depending upon any binding or high friction in the release system, and/or any misalignment between the truck tractor and the trailer, etc. Moreover, the hitch release handle is nearly universally positioned adjacent the frame of the tractor and inboard of the drive wheels, where it is not easily accessible. The awkward reach to access the release handle makes it even more difficult to gain leverage to overcome any resistance to its release.

As a result, a number of specialized fifth wheel jaw release tools, and combination tools comprising a fifth wheel release handle puller and other functions, have been developed in the past. Most such devices comprise a relatively simple bar or rod with a hook at one end, with the hook being secured to the fifth wheel release handle and the rod pulled to release the fifth wheel jaws. Some such devices comprise only a chain with a hook on the end for hooking to the release handle. Such devices provide no leverage for the user of the tool, and require an equal amount of force from the user as is required to pull the fifth wheel release handle directly. The amount of force required might at times be prohibitive, as noted further above, particularly for a person of lighter body build and/or suffering from some physical infirmity which prevents him or her from producing full strength.

This need has been recognized by a number of people, and has resulted in the development of various lever type tools to accomplish the release of a fifth wheel hitch connection between a truck tractor and semitrailer. However, all of the various devices of which the present inventor is aware, suffer from one or more defects which render them less than optimally suited for such work. Many do not fold compactly for storage in the limited space available in a truck tractor cab, while others fail to provide the adjustment needed for use with different truck tractors and trailers.

Accordingly, a need will be seen for a compactly folding fifth wheel release tool, which also provides the leverage often required to release the fifth wheel jaws of a tractor and trailer assembly. The present tool is also adjustable, in order to accommodate different dimensions between the outside of the tractor wheels and the side of the trailer, and the fifth wheel jaw release handle. A discussion of the related art of which the present inventor is aware, and its differences and distinctions from the present invention, is provided below.

U.S. Pat. No. 4,251,089 issued on Feb. 17, 1981 to Michael G. Skaggs, titled "Tractor-Trailer Vehicle Decoupling Tool," describes a second class lever type fifth wheel release tool, in which the release handle attachment linkage comprises two rods, with the distal rod being pivotally secured to the lever attachment rod between the handle end and the fulcrum. The pivoting rod pair provides some folding for storage for the Skaggs device, but the handle of the Skaggs tool does not fold or telescope for greater leverage, as is the case with the present tool. Moreover, the pivoting pull rod assembly of the Skaggs tool does not provide any adjustment, whereas the present tool is adjustable for different reaches between the side of the vehicle assembly and the release handle.

U.S. Pat. No. 4,778,181 issued on Oct. 18, 1988 to James L. Arney, titled "Hand Tool For Truck Drivers And Policemen," describes two separate tools, with one tool comprising an elongate telescoping rod having a hollow core capable of dispensing tear gas or the like. The Arney tool of interest herein, also comprises a telescoping rod with a hollow core. However, the Arney tool of interest includes a fifth wheel release hook which retracts to a substantially coaxial position with the telescoping extension for storage therein when the extension is retracted. The device described by Arney does not provide any leverage for the user; release force can only be applied in a purely linear direction, straight out from the fifth wheel release handle.

U.S. Pat. No. 4,871,182 issued on Oct. 3, 1989 to Russell G. Altherr et al., titled "Fifth Wheel Unlocking And Safety Latch Device," describes a fifth wheel assembly including an integral release handle and mechanism. No separate, portable release handle manipulating tool is disclosed, nor is any telescoping or folding means provided for the permanently installed release handle of the Altherr et al. fifth wheel assembly.

U.S. Pat. No. 4,991,893 issued on Feb. 12, 1991 to Russell B. Gordon et al., titled "Manhole Cover Lifting Device," describes a second class lever, i.e. a lever having a fulcrum at one end thereof with the applied force at the opposite end acting in the same direction as the resultant force therebetween. The present tool is also a second class lever, but differs from the Gordon et al. lever in that Gordon et al. fail to provide any telescoping or folding mechanism for their handle portion, and also fail to provide any length adjustment for the chain which applies the tensile force. Moreover, the relatively sharp fulcrum elements are unsuited for use against the side of a truck tire or trailer.

U.S. Pat. No. 5,344,201 issued on Sep. 6, 1994 to A. Dean Offin, titled "Multi-Function Tool For Truck Operators," describes a generally L-shaped tool having a short handle end normal to an elongate pull rod portion. A fifth wheel release handle hook is provided at the end of the pull rod opposite the handle. No folding or telescoping is provided in the Offin tool, nor is any form of leverage or mechanical advantage provided by Offin.

U.S. Pat. No. 5,378,007 issued on Jan. 3, 1995 to Ronald W. Joyce, titled "Trailer Hitch Uncoupling Apparatus And Method Of Use," describes a combination tool which may be used for releasing the fifth wheel of a tractor-trailer assembly, as well as for releasing the lock pin(s) for adjusting the position of the rear trailer wheels. The Joyce device is a first class lever when used to release the fifth wheel, i.e., the fulcrum is between the force applied by the user and the resultant force applied to the fifth wheel release, with the applied and resultant forces being in opposite directions. This results in the user having to push toward the truck and trailer assembly, rather than pulling away from the assembly as when the present tool is used. The need to push toward the vehicle to apply a pulling force on the release handle is not intuitive, and can be potentially hazardous if the release is stuck and then suddenly releases, with the user being suddenly propelled toward the side of the vehicle when the resisting force is released. Also, the element between the lever arm and the fifth wheel is rigid, although length adjustment is provided by means of a series of lever attachment holes therein. The rigid pulling element, along with the lack of folding of the lever arm, result in a somewhat bulkier tool than the tool of the present invention.

U.S. Pat. No. 5,423,567 issued on Jun. 13, 1995 to Bobby R. Upton, titled "Tractor Trailer Fifth Wheel Lever/Cable Assembly," describes three different embodiments of a fifth wheel release tool. Each of the embodiments comprises a second class lever, as in the present fifth wheel release tool. However, none of the Upton devices provide a collapsible lever arm or tension member having an adjustable length, as provided by the present tool.

U.S. Pat. No. 5,803,518 issued on Sep. 8, 1998 to Brian S. Gibbons, titled "Tandem Axle Trailer Pin Leverage Handle System," describes a second class lever tool intended for releasing the tandem axle lock pin at the rear of a semitrailer. The Gibbons tool includes a single piece handle incapable of being folded or collapsed, with a rigid rod having a fixed length being pivotally secured to the handle. While the Gibbons device might be capable of use as a fifth wheel handle release tool, the lack of folding for the handle and lack of length adjustment for the pull rod, result in a device unlike the present invention.

U.S. Pat. No. 5,863,060 issued on Jan. 26, 1999 to William E. Hollis et al., titled "Fifth Wheel King Pin Release Mechanism," describes a permanently mounted second class lever for releasing the fifth wheel latch mechanism. Hollis et al. provide a lever pivotally attached at one end to the fifth wheel, with a tensile member extending from a point between the pivotal attachment and the opposite handle end. While Hollis et al. provide an adjustable extension for the handle, they do not provide any means of removing the device from its essentially permanent installation for storage.

U.S. Pat. No. 5,988,666 issued on Nov. 23, 1999 to James H. Flater, titled "Fifth Wheel Hitch Release," describes a fifth wheel assembly having an integrated release mechanism therewith. Flater provides only a relatively short release handle with his fifth wheel mechanism, and does not provide any form of removable, collapsible or folding portable lever tool to assist in the release of the hitch mechanism.

U.S. Pat. No. 6,092,825 issued on Jul. 25, 2000 to James H. Flater, titled "Flatbar Fifth Wheel Release Handle," describes a mechanism closely related to that of the '666 U.S. Patent to the same inventor, discussed immediately above. The same points of difference between that device and the present invention noted in the above discussion, are seen to apply here as well.

U.S. Pat. No. 6,354,642 issued on Mar. 12, 2002 to Scotty E. Haggerty, titled "Puller And Locator For Trailer Tandem Axle Units," describes a combination tool having a telescoping length. The telescoping portion of the tool is used to apply tension adjustably to a spring, which is hooked to the axle assembly lock pin. A fifth wheel release hook is provided on the non-telescoping portion of the device opposite the handle, but no length adjustment or lever means is provided in the Haggerty combination tool.

U.S. Pat. No. D-377,924 issued on Feb. 11, 1997 to Greg A. Christensen, titled "Fifth Wheel Release Bar," illustrates a design apparently serving as a second class lever. However, no folding or collapsing of the handle portion is apparent, nor is any length adjustment for the pulling element apparent in the Christensen design.

British Patent Publication No. 1,407,084 published on Sep. 24, 1975, titled "A Fifth Wheel Coupler," describes a fifth wheel mechanism having a permanently installed release handle. No removably installable, portable release tool or lever means is disclosed in the '084 British Patent Publication.

Finally, British Patent Publication No. 2,160,163 published on Dec. 18, 1985, titled "Fifth-Wheel Trailer Coupling," describes another fifth wheel mechanism with a permanently installed release handle. As in the '084 British Patent Publication discussed immediately above, no removably installable, portable release tool or lever means is disclosed in the '163 British Patent Publication.

None of the above inventions and patents, taken either singly or in combination, is seen to describe the instant invention as claimed. Thus a fifth wheel release lever solving the aforementioned problems is desired.

SUMMARY OF THE INVENTION

The present fifth wheel release lever comprises a second class lever, i.e., a lever having a fulcrum at one end and handle at the opposite end, with the resistance being between the fulcrum and the handle. The fulcrum component comprises an elongate bar or pipe, which is pivotally attached to the lever component. The fulcrum bar is sufficiently long that it bridges the gap between the upper portion of one of the outboard rear tires of a truck tractor and the lower side of the forward end of a semitrailer hitched thereto. The lever portion of the device includes a telescoping distal or handle end, which retracts within the portion extending from the fulcrum bar for compact storage. The fulcrum bar may slide within a sleeve which is pivotally secured to the lever bar, in order to reduce the length of the device further for compact storage. The tension member which applies the force from the lever pipe or bar to the fifth wheel release handle is a flexible member having an adjustable length. A chain is preferably used as the tension member in the present tool, with a hook adjustably secured to one of the chain links as required for the specific span between the fifth wheel release handle and the outer walls of the truck tractor tires and the trailer.

The present tool is portable, and is easily stored in its folded state within a truck cab or other area of limited storage space. The tool is used by unwrapping the tension chain or member from the folded lever arm and fulcrum assembly, pivoting the fulcrum member to a position substantially normal to the lever arm, and positioning the fulcrum attachment end of the lever arm substantially medially along the fulcrum bar. The hook extending from the chain is secured to the fifth wheel release handle, and the fulcrum bar is placed across the span between the outer surface of the truck tractor rear tires and the overlying side of the trailer. The lever arm may be extended as required to provide the desired mechanical advantage, with the lever arm being pulled outwardly away from the side of the trailer and the truck tractor tires. This applies an outward pull of considerably more force to the tension member, which in turn applies this tensile force to the fifth wheel release handle. The tool is collapsed and folded and returned to its storage location after use.

Accordingly, it is a principal object of the invention to provide a portable fifth wheel release tool which collapses and folds compactly for storage when not in use.

It is another object of the invention to provide a fifth wheel release tool comprising a second class lever, in which the fulcrum member comprises a bar pivotally attached to the lever arm for compact storage.

It is a further object of the invention to provide a fifth wheel release tool in which the lever arm comprises a telescoping assembly, to further facilitate compact storage.

Still another object of the invention is to provide a fifth wheel release tool in which the member applying the tensile force is both flexible and adjustable in length, and which may comprise a chain with a hook installed adjustably thereon.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a portable hand tool for releasing the capture jaws of a truck tractor fifth wheel, to release a trailer king pin from the fifth wheel in order to unhitch the trailer from the tractor. Many times the latch mechanism can be difficult to release, due to excessive friction due to lack of lubrication, some misalignment between the truck tractor and the trailer, or for some other reason. The present invention provides a solution to the problem of difficult fifth wheel jaw release, by means of a sturdy leverage tool which can be folded or collapsed for compact storage in the limited space of a truck tractor for carriage by the operator.

Figure 1:
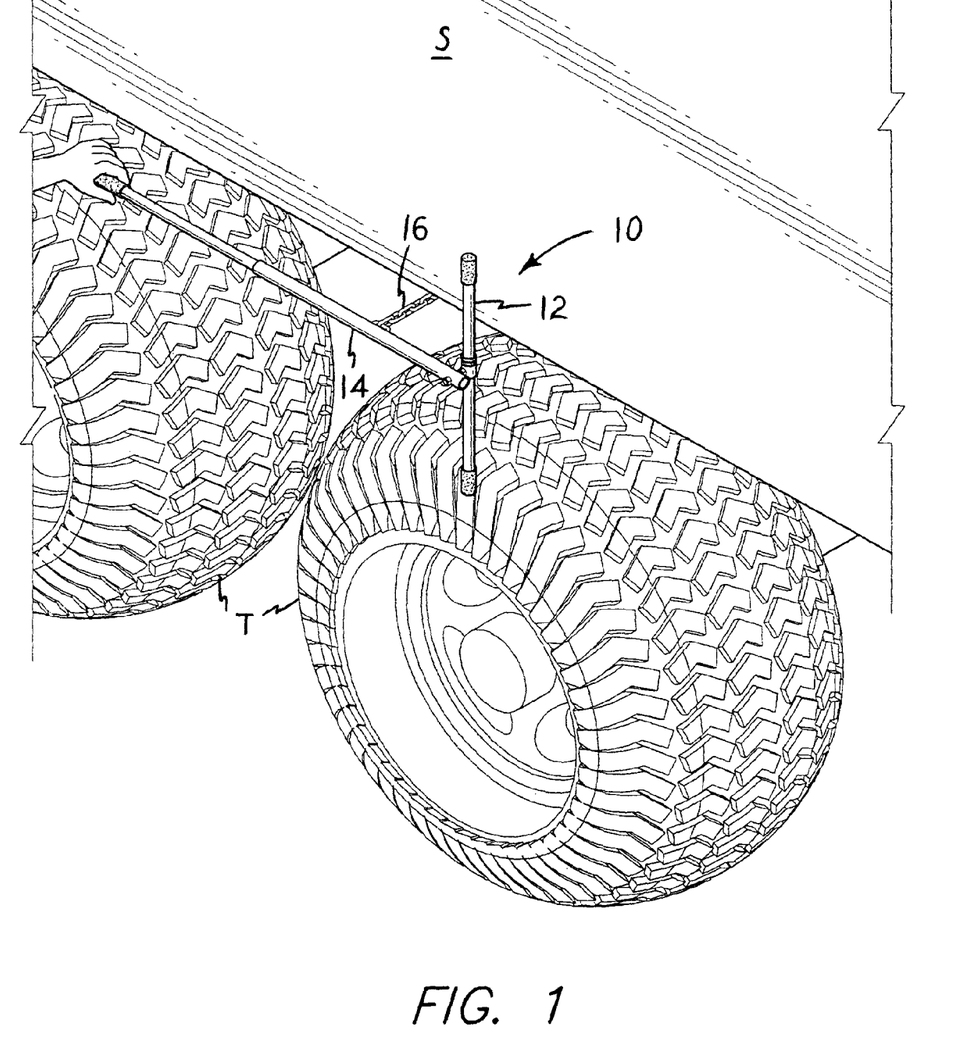
FIG. 1 is an environmental, perspective view of a fifth wheel release tool according to the present invention, showing its general configuration and use.

FIG. 1 provides a general perspective view of the present tool in use for the release of a fifth wheel hitch mechanism. The tool 10 includes an elongate fulcrum member 12, from which an elongate lever arm 14 extends. The fulcrum member 12 and lever arm 14 are preferably formed of reasonably heavy wall pipe or tube components, in order to provide the required resistance to bending. The lever arm 14 is preferably formed of two sections or lengths of material, with one section telescoping into the other for compact storage. The lever arm 14 is pivotally attached to the fulcrum member 12, again in order to facilitate compact storage of the device 10 when it is not in use.

Figure 2:
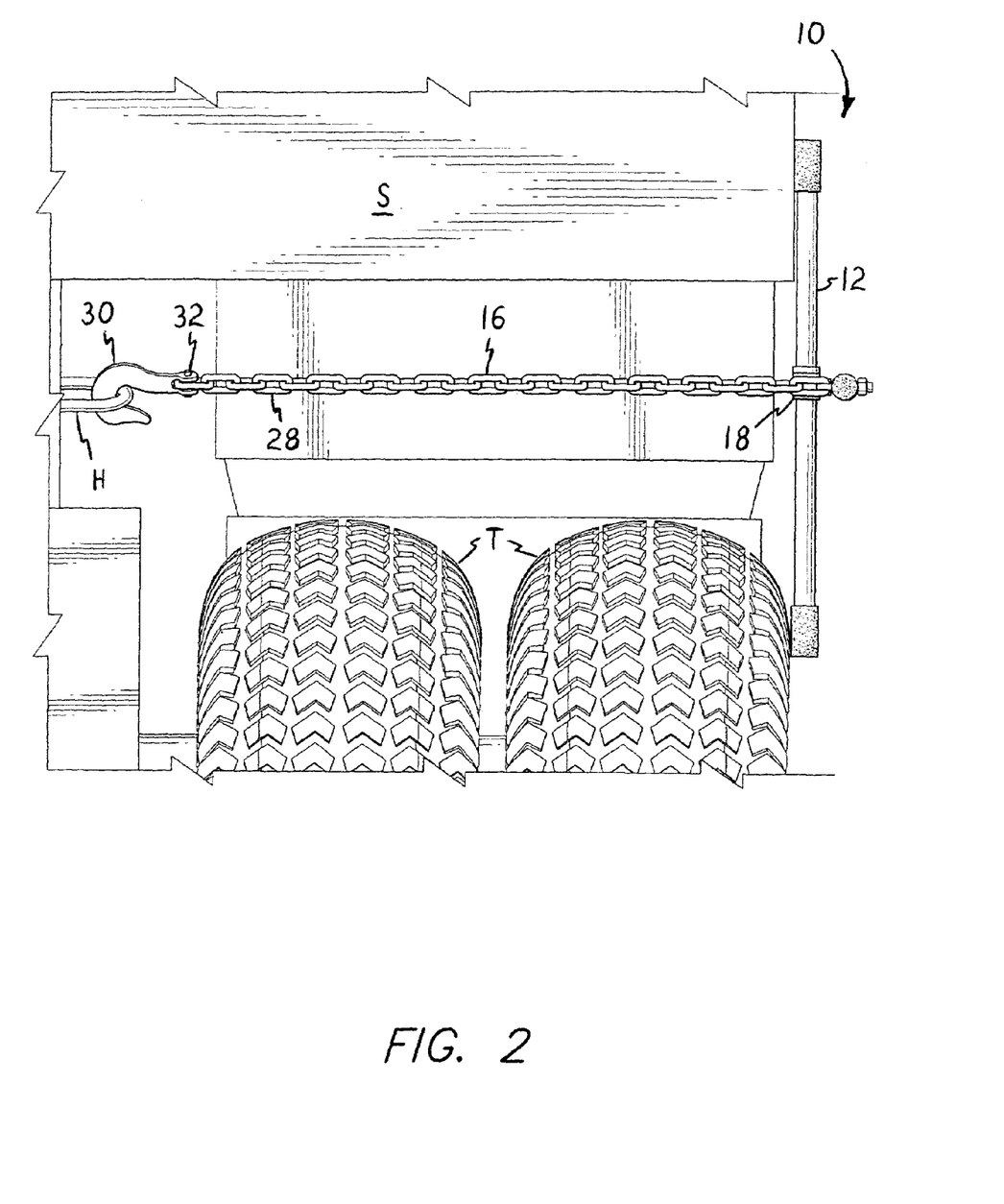
FIG. 2 is an environmental, elevation view, looking rearward from the tractor, showing the area between the truck tractor tires and the trailer, and showing the placement of the fulcrum bar and tension member for use of the fifth wheel release tool of the present invention.

FIG. 2 provides a front elevation view, i.e., looking rearwards beneath the forward end of a semitrailer S and over the tractor tires T, in order to show the connection of the pull member 16 of the device 10 which connects removably to the fifth wheel release pull handle H. The pull member 16 is a flexible device having an adjustably positionable release handle engaging member attached thereto. Preferably, the pull member 16 comprises a length of sturdy metal chain having a lever arm attachment end 18 secured to the working span portion 20 of the lever arm 14 (which extends between the fulcrum attachment end 22 and the opposite handle end 24 thereof, as shown more clearly in FIG. 4) by a link or eye 26 or other element welded or otherwise securely fastened thereto.

The opposite release handle hook attachment end portion 28 of the release handle puller 16 comprises several links having a release handle attachment hook 30 adjustably secured through one of the links thereof by a clevis pin 32, bolt, or other suitable means. This enables the distance or span between the hook 30 and the lever arm 14 to be adjusted as required to correspond with the distance or span between the fifth wheel release handle H and the side of the trailer S and tires T, across which the fulcrum member 12 is placed for use of the present tool 10.

Figure 4:
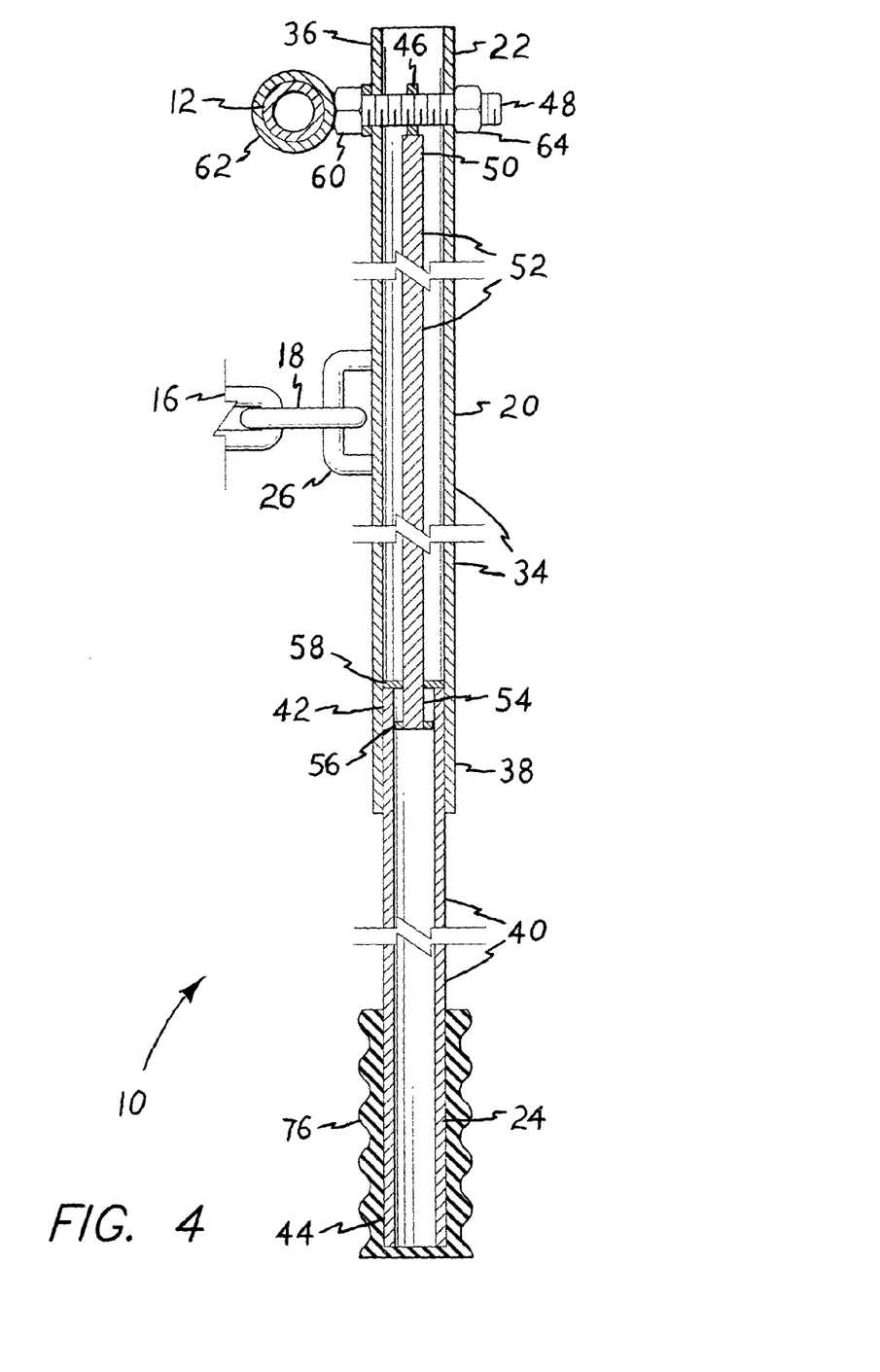
FIG. 4 is a side elevation view in section of the present tool in its extended state, showing the telescoping handle.

Details of the lever arm 14 are shown most clearly in FIG. 4 of the drawings. The lever arm 14 preferably comprises two distinct elongate tubular elements. The first is a hollow, elongate first lever arm section 34 extending from the fulcrum arm 12 and having a fulcrum arm attachment end 36 and an opposite extension end 38 for the second lever arm section, with the working span portion 20 providing for the attachment of the pull member or chain 16 lying between the two ends 36 and 38. The second lever arm section 40 telescopes into the first section 34, and includes a first lever arm section attachment end 42 and an opposite handle end 44.

The second lever arm section 40 is secured to the first lever arm section 34 by an internal mechanism, illustrated in FIG. 4, which prevents the separation of the two components 34 and 40 from one another. An anchor washer 46, eye, link, or the like is secured essentially immovably within the fulcrum attachment end 36 of the first handle section 34, held in place by a bolt 48 which is pivotally installed diametrically through the fulcrum attachment end 36 of the lever arm 14 and also serves to secure the lever arm 14 to the fulcrum member 12. The washer 46 is welded to the anchor end 50 of an elongate extension rod 52, which passes essentially coaxially through the first section 34 of the lever arm 14 from the fulcrum member attachment end 36 to the opposite second lever arm section end 38 thereof. The opposite second lever arm section stop end 54 of the extension rod 52 includes a first stop washer 56 or the like welded thereto, generally normal to the length of the extension rod 52 and concentric therewith. A second stop washer 58 surrounds the extension rod 52 and is welded across the first lever arm section attachment end 42 of the second lever arm section 40.

With this assembly, the second lever arm section 40 cannot separate from the first lever arm section 34 due to the first stop washer 56 being permanently attached onto the end of the extension arm 52, with that second stop washer 58 being affixed to the end 42 of the second lever arm section 40. This arrangement also permits the outside diameter of the second lever arm section 40 to match closely the inside diameter of the first lever arm section 34 to provide greater bending strength for the assembly, as the second section 40 need not have a smaller diameter to accommodate external collars and the like as are found in conventional retaining mechanisms for telescoping components.

Figure 3:
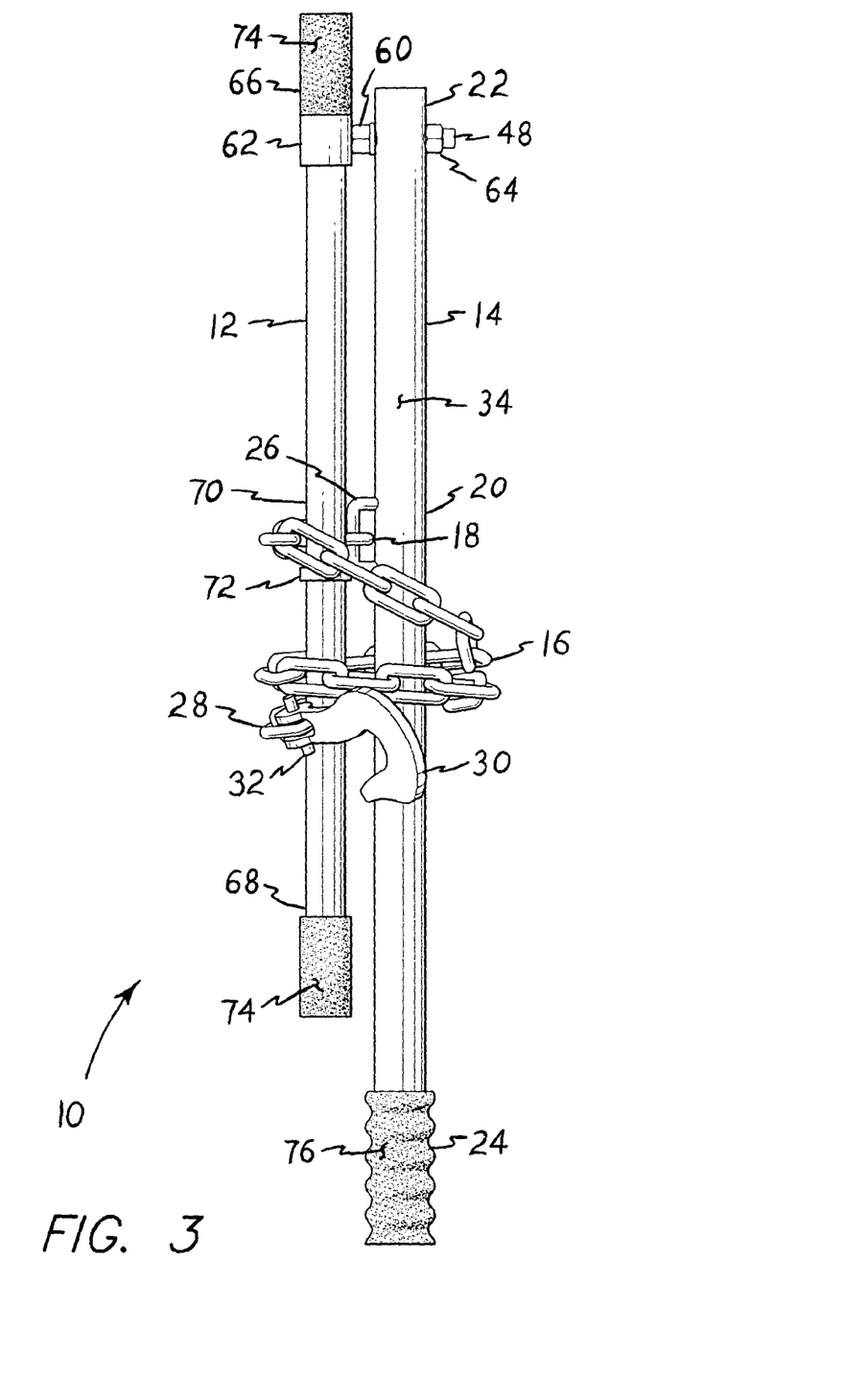
FIG. 3 is a side elevation view of the fifth wheel release tool of the present invention collapsed and folded for storage.

FIGS. 3 and 4 provide detailed illustrations of the fulcrum member 12 of the present tool 10, and its attachment to the lever arm 14. The lever arm attachment bolt 48 passes transversely through the fulcrum arm attachment end 36 of the lever arm assembly 14. The lever arm attachment bolt 48 has a head 60 on one end to which is welded a fulcrum member attachment sleeve 62, through which the fulcrum member 12 is slidable. The opposite end of the bolt 48 may be secured by a nut 64 (preferably a locking nut), to hold the bolt 48 in place through the fulcrum arm attachment end 36 of the lever arm assembly 14. Washers and/or other friction reducing means may be installed between the bolt head 60 and/or nut 64 and the surface of the fulcrum attachment end 36 of the lever assembly 14 to allow the bolt 48 to pivot within its passage.

The fulcrum member 12 passes through the attachment sleeve 62 and includes opposite first and second ends, respectively 66 and 68, and a medial portion 70 between the two ends 66 and 68. The attachment sleeve 62 provides a somewhat loose fit about the diameter of the fulcrum member 12, which permits the fulcrum member 12 to slide back and forth within the attachment sleeve 62. This sliding movement of the fulcrum member 12 within the sleeve 62 is limited by a stop flange 72 which is welded or otherwise immovably affixed to the medial portion 70 of the fulcrum member 12, and by a larger diameter pad 74 (e.g. short section of hose, etc.) installed upon each end 66 and 68 of the fulcrum member 12 to protect the surface against which the fulcrum member 12 bears during operation of the tool. A separate stop flange, not shown, may be provided at one end of the fulcrum member 12 if so desired, with the fulcrum member attachment sleeve 62 being captured between the medial stop flange 72 and the end stop sleeve. The handle end 24 of the lever arm assembly 14 may also be equipped with a hand grip 76, if so desired.

The above described features not only provide for an effective device which provides significant mechanical advantage for a person using the present fifth wheel release tool 10, but also provide for compact storage for the tool as well. The present fifth wheel release lever tool 10 may be collapsed and folded compactly for storage in the limited space generally provided in the typical truck tractor cab or attached storage compartment, generally as shown in FIG. 3. In FIG. 3, the second lever arm section 40 is not shown, as it has been telescoped into the surrounding, larger diameter first lever arm section 34. The fulcrum member 12 has been swung to lie substantially parallel to the lever arm assembly 14 by means of the pivotally attached sleeve 62, and slid through the sleeve 62 until movement therethrough is stopped by the upper end pad 74. The pull member chain 16 is then wrapped about the fulcrum member 12 and lever arm assembly 14 to secure the assembly for compact storage.

When the tool 10 is needed, it is retrieved from its storage area and the chain 16 unwrapped from about the fulcrum member 12 and lever arm 14. Any adjustments needed in the length of the chain 16 may be made by placing the still folded fulcrum member 12 and lever arm 14 atop the outer portion of one of the tires T near the fifth wheel release handle H, and securing the hook 30 to an appropriate link in the attachment end portion 28 of the chain 16 to provide the appropriate span between the hook 30 and the lever arm 14. The fulcrum 12 is then swiveled to a position generally normal to the lever arm assembly 14 and slid through its attachment sleeve 62 until the stop flange 72 rests atop the attachment sleeve 62. The fulcrum 12 is positioned to bridge the space between the truck tractor tire T and overlying forward portion of the semi trailer S, generally as shown in FIGS. 1 and 2.

At this point, a person using the present tool 10 need only apply a force on the lever arm 14 outwardly away from the truck in order to break the fifth wheel release handle H loose and release the fifth wheel hitch, the sleeve 62 rotating around the fulcrum 12. Greater leverage may be achieved by extending the second section 40 of the lever arm assembly 14, as required.

It will be noted that the fulcrum member stop flange 72 is positioned above the attachment sleeve 62 to stop the fulcrum member 12 at a generally medial position relative to the attachment sleeve 62 when the lever arm 14 is oriented to the left, as shown in FIG. 1. This is the orientation in which the present tool 10 will be used in the majority of cases, as nearly all fifth wheel release handles are oriented toward the left side of the truck, particularly in trucks having left hand steering and built for use in the United States. This arrangement orients the lever arm forwardly, toward the cab of the truck tractor.

However, it will be readily recognized that the present tool 10 may be oriented with the lever handle 14 in the opposite direction, merely by rotating the fulcrum member 12 and its attachment sleeve 62 one hundred eighty degrees relative to the lever arm assembly 14. Thus, the present fifth wheel release lever tool 10 may be used on either the left or the right side of a truck, depending upon which side the fifth wheel release handle is positioned, and may be used with the lever arm oriented either toward the front or the rear of the truck, as desired.

Once the fifth wheel hitch jaws have been released, the user of the present tool need only reach beneath the front of the trailer to unhook the hook 30 from the fifth wheel release handle, telescope the second lever arm section 40 into the first lever arm section 34, rotate the fulcrum member 12 parallel to the lever arm assembly 14 and slide the fulcrum member 12 through its attachment sleeve 62 to position the fulcrum member 12 along the lever arm assembly 14, and wrap the chain 16 about the fulcrum member 12 and lever arm assembly 14. The device may then be stored in an appropriate area or compartment until needed in the future.

Pads 74 may be made from a material having a high coefficient of friction in order to prevent the fulcrum 12 from rolling on the semitrailer S or tires T.

In conclusion, the present fifth wheel release lever tool 10 provides an accessory which will be greatly appreciated by drivers and others in the trucking industry. The present tool 10 not only provides the user with the leverage or mechanical advantage which is often needed to release sticking fifth wheel hitch mechanisms, but also provides a tool which folds and collapses compactly for efficient storage in the generally limited storage areas available in most truck tractors. The present tool 10 is constructed of extremely sturdy materials, and will provide long term use for a person using the present tool. The present tool 10, with its combination of leverage or mechanical advantage, adjustability, durability, and compact storage, will find widespread favor among drivers and others in the trucking industry who have need for such a device.

It is to be understood that the present invention is not limited to the embodiment described above, but encompasses any and all embodiments within the scope of the following claims.

I claim:

1. A portable fifth wheel release lever for opening release jaws of a fifth wheel, comprising:
    an elongate fulcrum member having a first end, a second end opposite the first end, and a medial portion therebetween;
    an elongate lever arm having a fulcrum attachment end, a handle end opposite the fulcrum attachment end, and a working span therebetween;
    a fulcrum member attachment sleeve pivotally attached to the fulcrum attachment end of said lever arm, the medial portion of said fulcrum member being slidable in the sleeve; and
    a fifth wheel release handle pull member extending from the working span of said lever arm.

2. The portable fifth wheel release lever according to claim 1, wherein said lever arm further comprises:
    a hollow, elongate first lever arm section having a first end defining the fulcrum attachment end of said lever arm and having a second end, the working span of said lever arm extending between the first end and the second end of the first lever arm section; and
    an elongate second lever arm section telescopingly extending from the first lever arm section, and having stop end and having a handle end disposed outside of the first lever arm section.

3. The portable fifth wheel release lever according to claim 2, further including:
    a bolt pivotally disposed transversely through the fulcrum attachment end of said lever arm;
    an elongate extension rod attached to and extending normal from said bolt, the extension rod being disposed substantially coaxially within said lever arm and having a stop end opposite said bolt;
    a first stop washer affixed to and extending radially about the stop end of said extension rod; and
    a second stop washer affixed to the stop end of the second lever arm section, the extension rod being slidable through the second stop washer with the first stop washer extending into the second lever arm section, precluding removal of said second lever arm section from said first lever arm section.

4. The portable fifth wheel release lever according to claim 1, wherein said fifth wheel release handle pull member further comprises:
    a flexible fifth wheel release handle pull chain extending from the working span of said lever arm, the chain having a lever attachment end and a release handle attachment end portion opposite the lever attachment end; and
    a hook adjustably secured to the release handle attachment end portion of the chain.

5. The portable fifth wheel release lever according to claim 1, further including a bolt pivotally disposed transversely through the fulcrum attachment end of said lever arm, and having opposite ends extending therefrom, the fulcrum member attachment sleeve being immovably affixed to one of said ends of said bolt.

6. The portable fifth wheel release lever according to claim 1, wherein:
    said fulcrum member is slidingly disposed within said fulcrum member attachment sleeve; and
    said fulcrum member further includes a single stop flange immovably affixed generally about said medial portion thereof.

7. A portable fifth wheel release lever, comprising:
    an elongate fulcrum member having a first end, a second end opposite said first end, and a medial portion therebetween;
    a lever arm, comprising:
        a hollow, elongate first lever arm section having a fulcrum attachment end secured to said fulcrum member, a second lever arm extension end opposite said fulcrum attachment end, and a working span therebetween;
    an elongate second lever arm section telescopingly extending from said first lever arm section, and having a first lever arm section attachment end and a handle end opposite said first lever arm section attachment end; and
    a fifth wheel release handle pull member extending from said working span of said first lever arm section, wherein said fifth wheel release handle pull member further comprises:
        a flexible chain extending from said working span of said first lever arm section, having a lever arm attachment end and a release handle hook attachment end portion opposite said lever arm attachment end; and
    a release handle attachment hook adjustably secured to said release handle hook attachment end portion of said chain.

8. The portable fifth wheel release lever according to claim 7, further including:
    a bolt pivotally disposed transversely through said fulcrum attachment end of said lever arm;
    an anchor washer disposed about said bolt, within said fulcrum attachment end of said lever arm;
    an elongate extension rod disposed substantially coaxially within said lever arm, having an anchor end affixed to said anchor washer and a second lever arm section stop end opposite said anchor end;
    a first stop washer affixed to said second lever arm section stop end of said extension rod, disposed within said second lever arm section; and
    a second stop washer captured upon said extension rod and affixed to said first lever arm section attachment end of said second lever arm section, precluding removal of said second lever arm section from said first lever arm section.

9. The portable fifth wheel release lever according to claim 7, further including a fulcrum member attachment sleeve pivotally secured to said fulcrum attachment end of said first lever arm section and surrounding said fulcrum member, pivotally securing said fulcrum member to said first lever arm section.

10. The portable fifth wheel release lever according to claim 7, further including:
    a bolt pivotally disposed generally diametrically through said fulcrum attachment end of said lever arm, and having opposite ends extending therefrom; and
    said fulcrum member attachment sleeve being immovably affixed to one of said ends of said bolt.

11. The portable fifth wheel release lever according to claim 7, wherein:
    said fulcrum member is slidingly disposed within said fulcrum member attachment sleeve; and said fulcrum member further includes a single stop flange immovably affixed generally about said medial portion thereof.

12. A portable fifth wheel release lever, comprising:

an elongate fulcrum member having a first end, a second end opposite said first end, and a medial portion therebetween;

an elongate lever arm having a fulcrum attachment end secured to said fulcrum member, a handle end opposite said fulcrum attachment end, and a working span therebetween;

a fulcrum member attachment sleeve pivotally secured to said fulcrum attachment end of said lever arm and surrounding said fulcrum member, pivotally securing said fulcrum member to said lever arm;

a flexible fifth wheel release handle pull chain extending from said working span of said first lever arm section, having a lever arm attachment end and a release handle hook attachment end portion opposite said lever arm attachment end; and a release handle attachment hook adjustably secured to said release handle hook attachment end portion of said chain.

13. The portable fifth wheel release lever according to claim 12, wherein said lever arm further comprises:

a hollow, elongate first lever arm section having a fulcrum attachment end secured to said fulcrum member, a second lever arm extension end opposite said fulcrum attachment end, with said working span disposed therebetween; and an elongate second lever arm section telescopingly extending from said first lever arm section, and having a first lever arm section attachment end and a handle end opposite said first lever arm section attachment end.

14. The portable fifth wheel release lever according to claim 13, further including:

a bolt pivotally disposed generally diametrically through said fulcrum attachment end of said lever arm;

an anchor washer disposed about said bolt, within said fulcrum attachment end of said lever arm;

an elongate extension rod disposed substantially coaxially within said lever arm, having an anchor end affixed to said anchor washer and a second lever arm section stop end opposite said anchor end;

a first stop washer affixed to said second lever arm section stop end of said extension rod, disposed within said second lever arm section; and a second stop washer captured upon said extension rod and affixed to said first lever arm section attachment end of said second lever arm section, precluding removal of said second lever arm section from said first lever arm section.

15. The portable fifth wheel release lever according to claim 12, further including:

a bolt pivotally disposed generally diametrically through said fulcrum attachment end of said lever arm, and having opposite ends extending therefrom; and said fulcrum member attachment sleeve being immovably affixed to one of said ends of said bolt.

16. The portable fifth wheel release lever according to claim 12, wherein:

said fulcrum member is slidingly disposed within said fulcrum member attachment sleeve; and said fulcrum member further includes a single stop flange immovably affixed generally about said medial portion thereof.

* * * * *